United States Patent

Wu et al.

[11] Patent Number: 5,863,983
[45] Date of Patent: Jan. 26, 1999

[54] MANUFACTURING METHOD FOR BLOCKED AQUEOUS DISPERSION OF POLYURETHANES

[75] Inventors: Jongfu Wu; Cheng Kun Lin; Wen-Tung Chen, all of Tu Chen, Taiwan

[73] Assignee: China Textile Institute, Taipei Hsien, Taiwan

[21] Appl. No.: 917,273

[22] Filed: Aug. 25, 1997

[51] Int. Cl.$^6$ ............................... C08J 3/00; C08K 3/20; C08L 75/00
[52] U.S. Cl. ............................ 524/839; 524/539; 524/591; 524/840
[58] Field of Search ................................... 524/539, 591, 524/839, 840

[56] References Cited

U.S. PATENT DOCUMENTS

| | | | |
|---|---|---|---|
| 4,108,814 | 8/1978 | Reiff et al. | 260/29.2 TN |
| 5,446,082 | 8/1995 | Asai et al. | 524/389 |
| 5,583,176 | 12/1996 | Haberle | 524/591 |

OTHER PUBLICATIONS

Odian, G., Principles of Polymerization, 1981, pp. 20–25.

*Primary Examiner*—Patrick D. Niland
*Attorney, Agent, or Firm*—Rosenberg, Klein & Bilker

[57] ABSTRACT

A blocked hydrophilic polyurethane with molecular weight of 500~40,000, 5~70% solid content and 5~200 milliequivalent per 100 g polymer of sulfonic acid salt, can be prepared from following reactants:

a. Organic isocyanates;
b. Polyols, including polyether polyol, polyester polyol, polycarbonate, and polycaprolactone, that can participate in the polyaddition reactions with isocyanates.
c. Polyols containing sulfonate group.
d. Organic blocking agents capable of reacting with isocyanates.

The blocked hydrophilic PU resins formed from above reactants can be applied for the anti-wrinkle treatment of cellulosic textiles with excellent performance.

9 Claims, No Drawings

MANUFACTURING METHOD FOR BLOCKED AQUEOUS DISPERSION OF POLYURETHANES

FIELD OF THE INVENTION

This invention relates to the synthesis of hydrophilic prepolymer of polyurethanes with the introduction of polyols containing sulfonate, followed by blocking reaction and water dispersion. This series of aqueous dispersion of polyurethanes can be used in the treatment of cellulose fibers for wrinkle-free, improved retention of fiber strength, crease recovery angle and press durability.

DESCRIPTION OF PRIOR ART

The advanced finishing technique of cellulosic fibers can impart the dimensional and shape stability under normal usage along with smooth feeling in touching. The finishing agent must be water soluble or water dispersible in treating the fibers for wrinkle resistance.

Up to date, the anti-wrinkle agents have been based on methylol compounds, such as dimethylol ethylene urea, dimethylol dihydroxyethylene urea (DMDHEU), urea-formaldehyde, melaminne-formaldehyde condensates etc. However, these resins during fiber finishing operation can liberate formaldehyde causing occupational health problem.

In addition, polycarboxylic acid can also be used as anti-wrinkle agent under catalyst, as described under U.S. Pat. Nos. 4,975,209, 4,820,307 and 5,221,285, but these crosslinked polycarboxylic acids tend to weaken the tear strength of fabrics.

For the use of blocked polyisocyanates as anti-wrinkle agents have been reported in Textilveredelung, 2 (7), 441 (1967); Textilverdelung, 13 (11), 454 (1978); Ind. Eng. Chem. Prod Rcs. Dev., 21 (1),4–11 (1982) and U.S. Pat. No. 5508370.

In general, the preparation of hydrophilic polyurethane (PU) resins can be done by introducing ionic groups or ethylene oxide as hydrophilic group to the polymer chains to render PU water dispersible. The blocked hydrophilic PU resins belong to thermosetting type, which upon heating to the dissociation temperature can release isocyanate to react with hydroxyl groups. Thus, this blocking type water dispersion of PU resins can be used in the surface treatment of textiles, wood products, papers and plastics.

When the blocked hydrophilic PU resins are used in anti-wrinkle treatment of cellulosic fabrics, other additives such as smoothing agent, softening agent, crosslinking agent and catalyst should be compatible with hydrophilic PU resins. Accordingly, the hydrophilic group for PU resins should be either (1) sulfonate compounds and/or (2) ethylene oxide derivatives, in order to attain better compatibility with other additives. For anti-wrinkle treatment, the amount of blocking type hydrophilic PU resins should be about 3–25% (by weight), and best around 5–17%.

In the case using sulfonate as the hydrophilic group, following diols containing sulfonate group were reported in the German Patent 2,446,440:

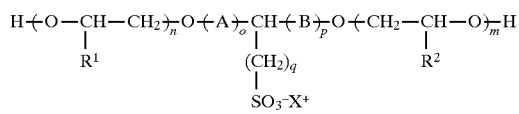

where

A and B: aliphatic hydrocarbons with 1–6 carbon atoms $R^1$ and $R^2$: hydrogen or aliphatic hydrocarbon with 1–4 carbon atoms or benzene ring $X^+$: cation of alkali or ammonium salt n, m: 0 or 1–30 o, p: 0 or 1 q: 0., 1, or 2.

In the Japanese Patent No. 5-1 32537, the following sulfonates were reported

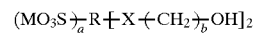

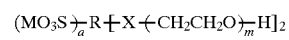

where a : 1 or 2
b : 1~5
m, n: integer of 1~3

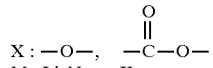

M : Li, Na, or K

R :

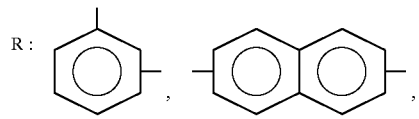

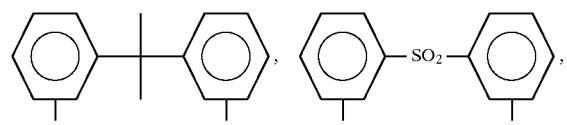

In the U.S. Pat. No. 5,508,370 the sulfonate derivatives were based on 2-butene-1,4-diol.

In the Patent PCT/US95/00030, 5-sulfoisophthalic acid monosodium salt was used to prepare hydrophilic PU resin adhesive.

In the U.S. Pat. No. 4,870,129, the sodium sulfonate of N-(2-aminoethyl)-2-aminoethane was used in the preparation of aqueous polyurethane adhesive, showing better thermal stability and low activation temperature.

In the U.S. Pat. No. 4,663,377, it was reported to use a mixture of polyisocyanate crosslinking agent with hydrophilic PU resins containing sulfonate to improve the heat resistance of PU resins.

APPROACH IN SOLVING PROBLEM

The sulfonate structure in the blocked hydrophilic PU resins has good compatibility with additives during anti-wrinkle treatment of textiles. Thus, in this invention, Diols with sulfonic acid salt have been selected as basic raw materials for manufacturing blocked hydrophilic PU resins with following structures:

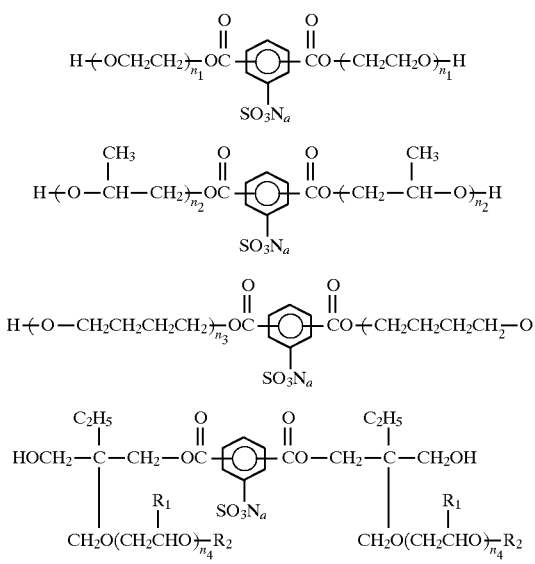

where
- $n_1$: 1~60
- $n_2$=1~100
- $n_3$=1~30
- $n_4$=1~40
- $R_1$=H or $CH_3$
- $R_2$=$CH_3$ or $CH_2CH_2CH_2SO_3Na$ The content of sulfonate diols in the hydrophilic PU resins is between 5 to 200 meq/100 g. The preparation involves the esterification or trans-esterification of diols with either 5-sulfoisophthalic acid monosodium salt or 5-sulfoisophthalic acid dimethyl ester salt to form polyols with sulfonic acid salt.

In this invention, the diisocyanates include aliphatic diisocyanates or aromatic diisocyanates or their mixture:
1. Aliphatic diisocyanates such as isophorone diisocyanate, 4-4-dicyclohexylmethane diisocyanate ($H_{12}$MDI), 1,6-hexamethylene diisocyanate (HDI) or tetramethylxylylene diisocyanate (TMXDI).
2. Aromatic diisocyanates such as diphenylmethane-4,4-diisocyanate (MDI), tolulene diisocyanate (TDI) or xylylene diisocyanate(XDI).

In this invention, the mole ratio of diisocyanate with polyol (NCO/OH) is around 1.1–2.5, in which the polyols include the following series:

1. Polyester polyols:
Polyethylene adipate(PEA)
Polybutylene adipate(PBA)
Polyhexylene adipate(PHA)
Copolytrimethylolpropylene diethylene adipate
Copolytrimethylolpropylene hexylene adipate
Copolyhexylene neopentyl adipate
Copolyethylene butylene adipate.

2. Polyether polyols:
Polytetramethylene glycol(PTMG)
Polypropylene glycol(PPG)
Polyethylene glycol(PEG)

3. Polycarbonate polyol
4. Polycaprolactone
5. Mixture from above polyols.

The reaction temperature of the blocking agent with isocyanates is above 40° C. Suitable blocking agents include the following:

1. Malonic esters such as diethyl malonate.
2. Acetoacetic esters such as ethyl acetoacetate
3. Acetylacetone
4. Oximes such as acetoxime, methyl ethyl ketoxime, cyclohexanone oxime, acetophenone oxime or benzophenone oxime.
5. Lactams such as ϵ-caprolactam.

Standard methods for testing are used to examine the treated cotton textiles as following:
a. Tear strength by ASTM D-5035-90
b. Durable press grading by AATCC 124-1992 (1) IVA (2) 4 lb load 5 cycles.
c. Formaldehyde content by the Decree No.34 of the Japanese Ministry of Health.
d. Crease recovery angle by ASTM-1295-67.

This invention for blocked hydrophilic PU resins is applicable for the treatment of cotton textiles and will be discussed along with the examples of preparations in the next section.

PRACTICE EXAMPLES

Case 1

To a 1 l-separator type reactor add 20 g of copolybutylene hexylene adipate (PBHA, average mol. wt. 2,000), 80 g. of propylene glycol (PPG, av. mol. wt. 4,800) and 30 g. of compound (I) (n=25, mol wt. 2,232), the mixture is heated to 80° C. with stirring for 10 minutes under a stream of nitrogen, then, add 21 g of dicyclohexylmethane-4,4-diisocyanate to continue the reaction for 5 hours followed by addition of 9.37 g of diethyl malonate for 2 hours of blocking reaction. By infrared spectrometric analysis of the reaction mixture, it shows the disappearance of —N═C═O absorption band at 2270 $cm^{-1}$, indicating the completion of the blocking reaction. Finally, add 480 g of deionized water to disperse the reaction mixture to obtain a dispersion with 25% solid content, having particle size of 75 nm. The Brookfield viscosity of the aqueous dispersion of PU resins (25° C.) is 11 cps.

Case 2

To a 1 l-separator type reactor add 30 g of copolyhexylene neopentyl adipate (PHNA, av. mol. wt. 2,000), 70 g of polypropylene glycol (PPG, av. mol. wt. 6,000) and 50 g of compound (II) (n=85, mol. wt. 9,832) and 30 g of polyethylene glycol (mol. wt. 1,000). The mixture is heated at 80° C. with stirring or 10 minutes under nitrogen, the add 28.3 g of dicyclohexylmethane-4,4'-diisocyanate for reaction of 5 hours at the same temperature, followed by addition of ϵ-caprolactam for blocking reaction of 2 hours. By infrared spectrometric analysis of the reaction mixture it shows the complete disappearance of the —N═C═O band at 2260 $cm^{-1}$ indicating the completion of the blocking reaction. Finally, add 650 g of deionized water to the reaction mixture to obtain the aqueous dispersion of PU resins, having a solid content of 25% with particle size of 65 nm and a Brookfield viscosity of 15 cps (25° C.)

Case 3

To a 1 l-separator type reactor add 40 g of polyhexylene adipate (PHA, Av. mo. wt. 2,000), 60 g of polypropylene glycol (PPG, av. mol. wt 3,000), and 30 g of compound (IV) ($N_4$=24, $R_1$=H, $R_2$=$CH_3$), and the mixture is heated at 80° C. with stirring for 10 minutes under nitrogen, then, add 25.8 g of dicyclohexylmethane-4,4' diisocyanate at the same temperature for 5 hours of reaction, then, add 8.3 g of cyclohexanone oxime for one hour of blocking reaction. By infrared spectrometric analysis of the reaction mixture, it shows the complete absence of —N═C═O band at 2265 cm$^{-1}$, indicating the completion of the blocking reaction. Finally, add 489 g of deionized water to obtain an aqueous dispersion of PU resins having solid content of 25%, with particle size of 80 nm and Brookfield viscosity of 14 cps (25° C.).

A typical formulation for anti-wrinkle treatment is shown in Table 1.

A piece of whole cotton fabric (130×70/40×40's) is cut into 40 cm×40 cm samples, which are impregnated in the solution prepared according to the formulation in Table 1. After padding, the samples are dried at 120° C. for 2 minutes, then, crosslinked at 160° C. The results of weight add-on percentage, crease recovery angle, tear strength retention percentage, formaldehyde content, and DP grading are shown in Table 2.

From data given in Table 2, this invention using blocking type hydrophilic PU resins with Sulfonate group can improve hydrophilic properties with good compatibility to additives in the treatment of cotton and its mixed fibers for anti-wrinkling purpose, and also to upgrade the utilization of cellulosic textiles for wrinkle and crease proof.

Therefore, this invention is considered from legal sense in meeting the requirement for patent claims, anticipating favorable review in granting the patent right for the described invention.

TABLE 1

Formulation of Anti-Wrinkle Processing

| | Distilled water | Smoothing agent | Softening agent | Magnesium chloride | modified DMDHEU | Aq. PU | Cat. 32 |
|---|---|---|---|---|---|---|---|
| Wt. % | 79.6 | 1 | 3 | 1.8 | 6 | 8 | 0.6 |

Note:
DMDHEU for dimethylol dihydroxyethylene urea
Cat. 32: tin-containing catalyst

TABLE 2

Properties of Treated Cotton Fabric

| | Case 1 | Case 2 | Case 3 |
|---|---|---|---|
| Add-on percentage (%) | 1.96 | 2.08 | 2.10 |
| Dry crease recovery angle (Warp and Weft) | 295 | 288 | 290 |
| Tear strength retention percentage (%) | 81 | 88 | 85 |
| Formaldehyde content, (ppm) | 45 | 30 | 40 |
| Durable Press | 3.9 | 3.8 | 3.8 |

Note:
Dry crease recovery angle for untreated cotton fabric is 210°.

We claim:

1. A process for manufacturing a blocked aqueous dispersion of PU resins with weight average molecular weight ($\overline{M}w$) from 500 to 40000 having the steps of:

a. mixing an organic polyols with sulphonate containing polyols;

b. heating the mixture produced in step a;

c. adding an organic isocyanates to the mixture of step b; and d. mixing an organic blocking agents to the products of step c;

wherein the formula of said sulphonate containing polyols is selected from the groups consisting of:

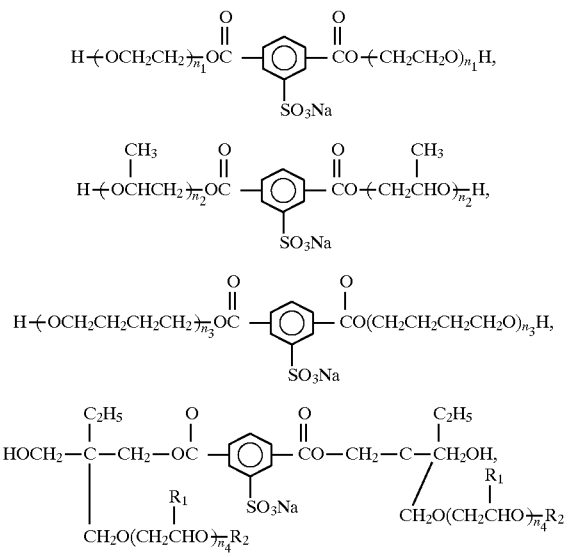

wherein $n_1=1\sim60$, $n_2=1\sim100$, $n_3=1\sim30$, $n_4=1\sim40$, $R_1$ is selected from the group consisting of H and $CH_3$, and $R_2$ is selected from the group having $CH_3$ and $CH_2CH_2CH_2SO_3Na$.

2. A process as claimed in claim 1, wherein the heating process in step b is carried out in a temperature about 80° C. for 10 mins.

3. A process as claimed in claim 1, wherein said organic isocyanates is selected from the group consisting of aliphatic polyisocyanates, aromatic polyisocyanates, alicyclic polyisocyanates and the mixture thereof.

4. A process as claimed in claim 1, wherein said organic polyol is selected from the groups consisting of polyether polyol, polyester polyol, polycarbonate, polycaprolactone and the mixture thereof.

5. A process as claimed in claim 1, wherein said organic blocking agent is selected from the groups consisting of malonate esters, acetoacetic esters, acetylacetone, oximes and lactams.

6. A process as claimed in claim 1, wherein said sulphonate containing polyols is in such an amount that the content of the sulfonate is 5 to 200 meq. per 100 g of blocked aqueous dispersion of PU resins and the solid content in said blocked aqueous dispersion of PU resins is 5~70% by weight.

7. A process as claimed in claim 1, wherein the molecular ratio between said organic isocyanate and said organic polyols is from 1.1~2.5.

8. A process as claimed in claim 3, wherein said aliphatic polyisocyanates is selected form the groups consisting of isophorone diisocyanate, 4,4-dicyclohexylmethane diisocyanate, 1,6-hexamethylene diisocyanate and tetramethylxylylene diisocyanate.

9. A process as claimed in claim 3, wherein said aromatic polyisocyanates is selected form the groups consisting of diphenylemethane-4,4-diisocyanate, tolulene diisocyanate and xylylene diisocyanate.

* * * * *